United States Patent
Kouchnir

(10) Patent No.: US 10,235,604 B2
(45) Date of Patent: Mar. 19, 2019

(54) AUTOMATIC WEARABLE ITEM CLASSIFICATION SYSTEMS AND METHODS BASED UPON NORMALIZED DEPICTIONS

(71) Applicant: Sophistio, Inc., Seattle, WA (US)

(72) Inventor: Beata Kouchnir, Seattle, WA (US)

(73) Assignee: SOPHISTIO, INC., Brooklyn, NY (US)

( * ) Notice: Subject to any disclaimer, the term of this patent is extended or adjusted under 35 U.S.C. 154(b) by 20 days.

(21) Appl. No.: 15/702,692

(22) Filed: Sep. 12, 2017

(65) Prior Publication Data

US 2018/0075323 A1    Mar. 15, 2018

Related U.S. Application Data

(60) Provisional application No. 62/394,079, filed on Sep. 13, 2016.

(51) Int. Cl.

| | |
|---|---|
| *G06K 9/00* | (2006.01) |
| *G06K 9/46* | (2006.01) |
| *G06K 9/62* | (2006.01) |
| *G06F 17/27* | (2006.01) |
| *G06F 17/30* | (2006.01) |
| *G06F 16/532* | (2019.01) |
| *G06F 16/951* | (2019.01) |
| *G06F 16/58* | (2019.01) |

(52) U.S. Cl.
CPC ......... *G06K 9/6269* (2013.01); *G06F 16/532* (2019.01); *G06F 16/5866* (2019.01); *G06F 16/951* (2019.01); *G06F 17/2785* (2013.01); *G06K 9/00624* (2013.01); *G06K 9/46* (2013.01); *G06K 9/6268* (2013.01)

(58) Field of Classification Search
CPC ... G10L 15/005; G10L 15/16; G06K 9/00604; G06K 9/0061
USPC .............. 382/165, 170, 171, 190, 209, 282; 358/537, 538, 453
See application file for complete search history.

(56) References Cited

U.S. PATENT DOCUMENTS

| | | | | |
|---|---|---|---|---|
| 6,629,844 | B1 * | 10/2003 | Jenkins | G09B 19/06 434/118 |
| 8,103,551 | B2 * | 1/2012 | Saul | G06N 3/02 705/26.1 |
| 8,249,941 | B2 * | 8/2012 | Saul | G06N 3/02 705/26.1 |
| 8,447,588 | B2 * | 5/2013 | Karttunen | G06F 17/2775 704/1 |
| 8,510,097 | B2 * | 8/2013 | Karttunen | G06F 17/2775 704/1 |
| 8,788,439 | B2 | 7/2014 | Martinez et al. | |
| 8,812,417 | B2 | 8/2014 | Martinez et al. | |

(Continued)

*Primary Examiner* — Yosef Kassa
(74) *Attorney, Agent, or Firm* — AEON Law, PLLC; Adam L. K. Philipp; Jonathan E. Olson

(57) ABSTRACT

Methods and systems are presented for obtaining numerous normalized wearable item depictions from a machine-learning-based image classification protocol that was trained using very numerous wearable item depictions that each associate one or more graphical images with corresponding textual metadata. After indexing the numerous normalized wearable item depictions so that the first functional module applies an appropriate protocol, matching content is deemed more relevant and selectively transmitted.

14 Claims, 13 Drawing Sheets

(56) References Cited

U.S. PATENT DOCUMENTS

| | | | |
|---|---|---|---|
| 8,893,418 B1 * | 11/2014 | Yochum | A41D 27/08 2/244 |
| 9,043,268 B2 * | 5/2015 | Backer | G06Q 40/00 707/726 |
| 9,390,348 B2 | 7/2016 | Zheng et al. | |
| 9,471,853 B2 | 10/2016 | Zheng et al. | |
| 9,684,838 B2 | 6/2017 | Adams | |
| 9,720,570 B2 | 8/2017 | Wernick et al. | |
| 2015/0332121 A1 | 11/2015 | Zheng et al. | |
| 2015/0379571 A1 | 12/2015 | Grbovic et al. | |
| 2016/0259980 A1 | 9/2016 | Mlybari et al. | |
| 2017/0046733 A1 | 2/2017 | Schler | |
| 2017/0091617 A1 | 3/2017 | Baughman et al. | |
| 2017/0132510 A1 | 5/2017 | Paluri et al. | |
| 2017/0213112 A1 | 7/2017 | Sachs et al. | |
| 2017/0235824 A1 | 8/2017 | Liu | |

* cited by examiner

Title: A-LINE DRESS IN MORNING FLORAL

Description: Made in a pretty primary-colored floral print for the ultimate pop, this dress is perfect for all those fun warm-weather occasions - think showers, brunches and summer parties.

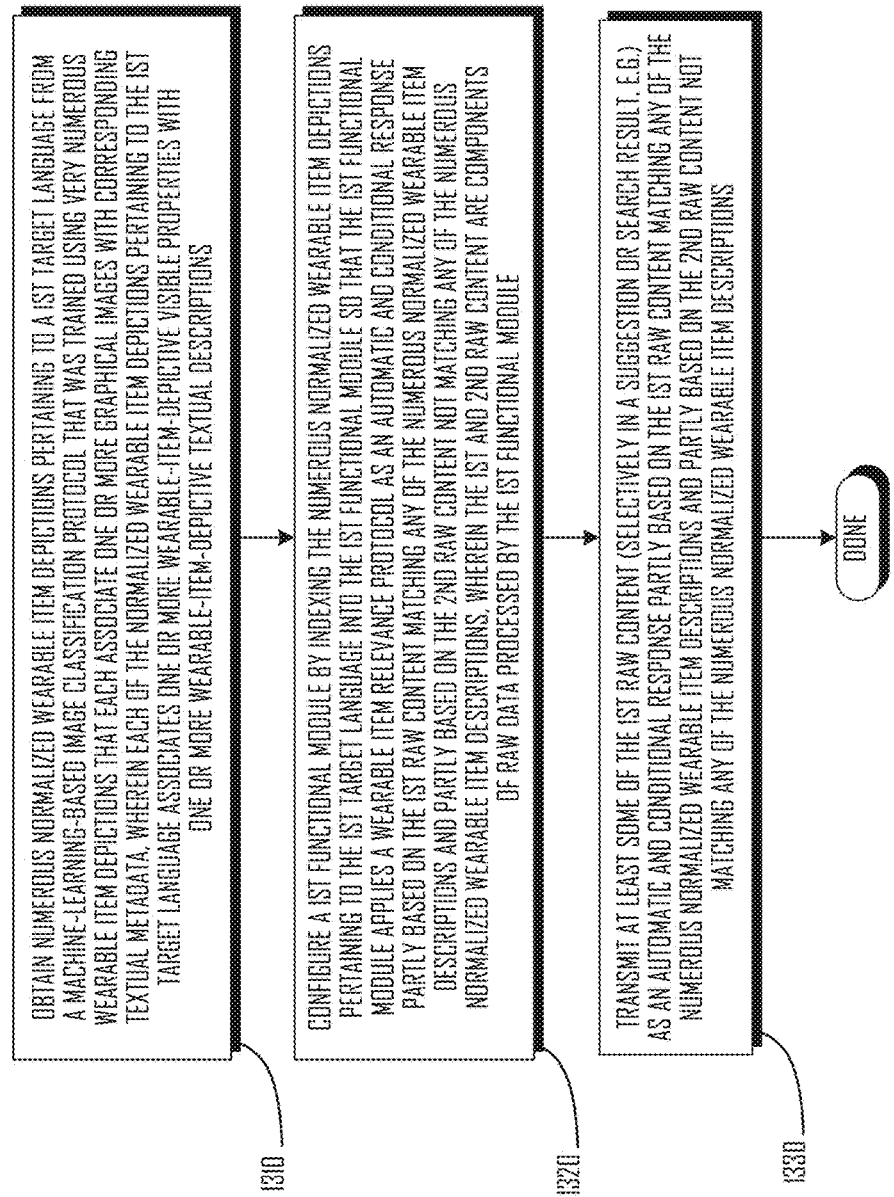

AUTOMATIC WEARABLE ITEM CLASSIFICATION SYSTEMS AND METHODS BASED UPON NORMALIZED DEPICTIONS

RELATED APPLICATIONS

This application claims the benefit of provisional U.S. App. No. 62/394,079 ("A Hybrid Textual/Visual Process for Fashion Product Description Generation & Search") filed 13 Sep. 2016, which is included herein by reference.

BACKGROUND

Many fashion products are sold online by a large number of retailers, but finding a desired product is a "needle in a haystack" problem.

Consumers search for fashion products based on their visual style attributes (e.g. sleeve length, pattern, silhouette, and the like); however general search engines (e.g. Google, Bing, Yahoo, and the like), as well as retailer-specific search engines (e.g. Nordstrom, Macy's, Neiman Marcus, and the like) are only able to index and retrieve products based on their textual metadata. Style attributes that are apparent to the human eye but are not captured in the textual metadata will not be indexed, and therefore not returned in searches for those attributes.

The algorithm most frequently used by search engines is tf-idf (text frequency-inverse document frequency). Tf-idf favors concise text that only contains information that is relevant to the search query. In contrast, language used to describe fashion products often contains extraneous editorial content (e.g. "this dress is perfect for all those fun warm-weather occasions—think showers, brunches and summer parties") that inflates the document's word count and thereby reduces its relevance score.

The language to describe a product's style attributes varies much more widely for fashion products than it does for other types of products such as electronics, appliances, tools, and the like. Search engines are unable to recognize fashion-specific synonyms and therefore do not return relevant products unless they match the query keywords (e.g. a search for "batwing sleeve sweater" will not return documents containing "dolman sleeve sweater" even though those terms are synonymous.)

Creating textual product metadata is currently a task that requires human effort. Depending on the resources dedicated to creating the metadata, its quality and comprehensiveness varies widely by manufacturer and/or vendor. Since search engines only have a product's textual metadata to work with, products with low-quality or incomplete textual metadata are ranked lower than those with more comprehensive metadata, and therefore rarely reach their target customers.

Textual product metadata, as well as the search engines that index it, are language-specific. A French-language search for "robe patineuse" will not return English-language documents containing the expression "skater dress" even though those phrases have the same meaning. To sell their merchandise to speakers of multiple languages, multi-national retailers have to translate their textual product metadata and have each language translation indexed separately. This process is expensive because it requires idiomatic knowledge of fashion terminology for each target language.

SUMMARY

The methods described below comprise an end-to-end process of training a machine-learning-based fashion product image classification system, using the output of that classification system to generate normalized product descriptions, indexing the generated product information into a search engine, optimizing the search engine for the fashion vertical, and a graphical user interface that allows consumers to interact with the search engine. Also included below is a method for localizing the above process to other languages or other contexts.

The machine-learning-based fashion product image classification system is the backbone of the end-to-end process described above, and requires a one-off implementation commonly referred to as "training". The training data for the image classification system is generated from example products that have both images and textual metadata available. The textual metadata is pre-processed to extract relevant snippets such as "¾ sleeves" or "fit-and-flare" from unstructured paragraphs of text. The extracted snippets are mapped to a comprehensive product schema for each product category that is comprised of that category's visual and structural attributes (e.g. women's tops have attributes such as body length, sleeve length, neckline type, and the like). The image classification system is comprised of individual classifiers for each attribute of each product schema. The values of the schema properties—i.e. the text snippets described above—serve as target labels for the image classifier. The image classifiers learn which patterns in the training images correspond to which labels, so that they can predict labels for previously unseen product images.

With the trained image classification system in place, textual descriptions can be generated for any number of new—i.e. unknown to the image classification system—products. For products that do not have any pre-existing textual metadata, all product information is derived from the output of the image classification system—the labels predicted by the classifiers are mapped as values to the attributes of the product schemas described above. If a new product does have pre-existing textual metadata, that metadata is pre-processed in the same way as the textual metadata of the training products—relevant snippets are extracted from unstructured text. In cases where the extracted text data conflicts with the output from the image classification system, the product is manually reviewed to determine if the textual metadata was inaccurate, or one of the classification algorithms classified the product incorrectly. In case of the latter, the product is manually labeled with the correct class and used to re-train the image classifier to improve its accuracy. As the image classification system becomes more accurate after several iterations of re-training, it will be trusted over the external textual metadata and the manual review can happen less frequently.

Once a product's schema is populated either by the image classification system on its own, or by a combination of image classification and textual data extraction, it is used to generate a comprehensive, natural-language product description. This can be accomplished by creating a template for a syntactically correct paragraph comprised of two or three sentences. The values of the structured schema fields are plugged into the template and adjusted for correct language syntax. While a populated product schema is sufficient for search indexing and retrieval purposes, a natural language description is usually easier for humans to read, and is therefore preferential to display in the user interface on the product detail pages.

The detailed product schema generated in previous steps of the process already contains most of the information that is needed to retrieve the product via a search engine, so it can be indexed into the search engine with minimal customization. To increase recall, a synonym dictionary is generated for the values of the structured fields (e.g. "batwing sleeves" is synonymous with "dolman sleeves") and added to the index. The values of the product schema fields are not only searchable, but also serve as facets in the graphical user interface and are used as suggestions for auto-completion in the interface's search fields.

When a consumer starts typing their search in the graphical user interface, the interface suggests values of the product schema fields that match the consumer's input for auto-completion. Values from various fields of the same product schema are logically chained together to suggest more complex search queries. A second, negative search field, offers consumers the option to enter a query for attributes the consumer does not want. Once one or both search queries are entered, the search engine returns matching products from the index. To be returned as a match, all words from the query string must match either directly or as a synonym, and if provided, none of the words or synonyms of the negative query string must match. To refine the search results, the graphical user interfaces displays the facets of the index as represented by the structured schema fields and their values. Furthermore, if a consumer sees a product and wishes to see products that are visually and structurally similar, they can click a "more like this" link on the product's thumbnail, and the search results will be re-ranked to show similar products first.

The above process can be localized to different languages by mapping the values of each attribute to an idiomatic translation in the target language, as well as mapping the description generation template to a syntactically correct template in the target language. This method requires that a translation is created only once for each attribute value and template, instead of every time a new product is added.

Alternate embodiments of this process are other product verticals where images have known structural qualities, such as jewelry, home décor, furniture, art, and the like. Subsets of the process can be used as standalone processes for image description generation, and/or for building a search backend to use with other interfaces.

BRIEF DESCRIPTION OF THE DRAWINGS

FIG. 13 depicts a content handling method.

DETAILED DESCRIPTION

Figure 1:
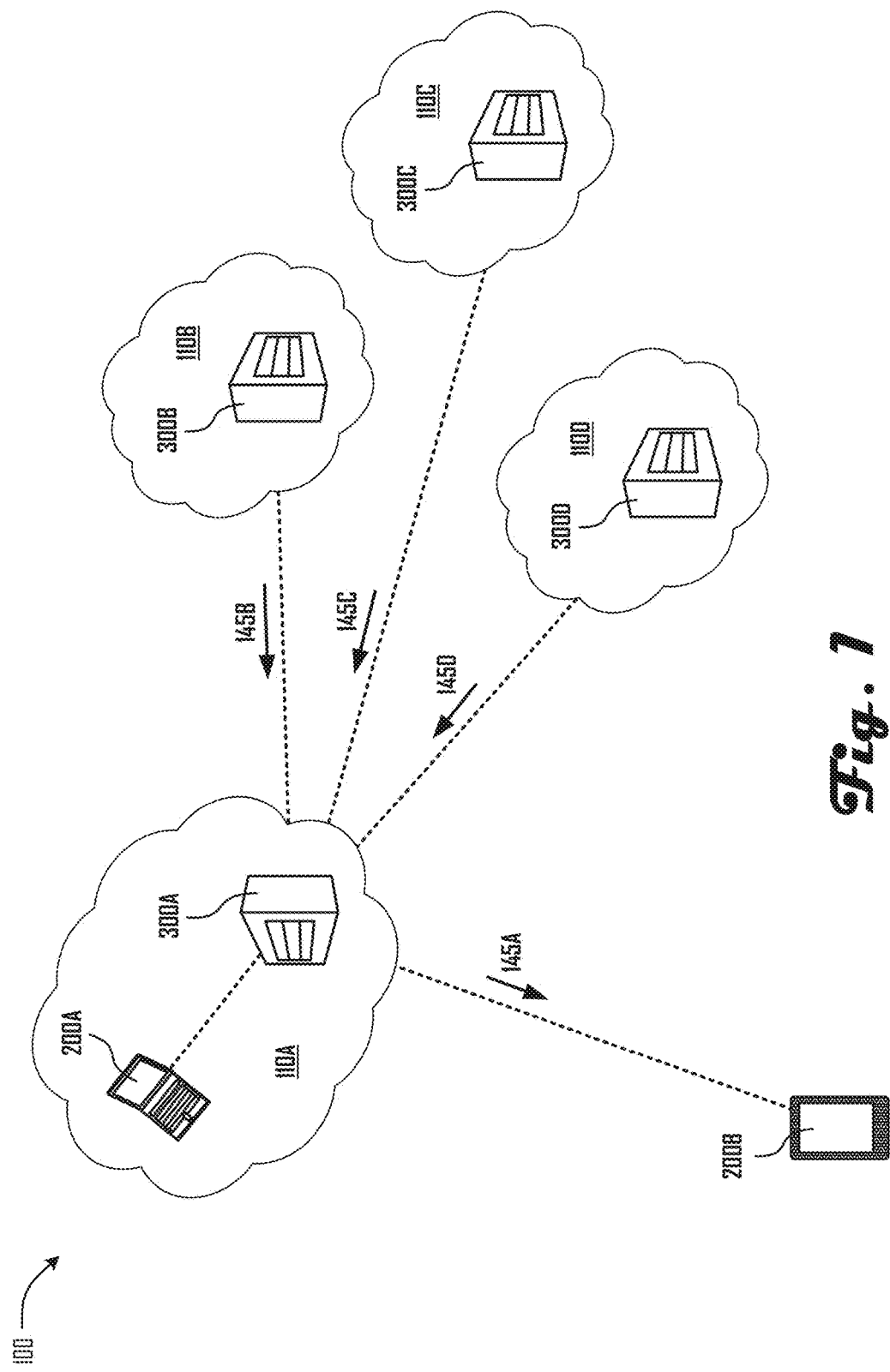
FIG. 1 depicts a system with a server and several client devices.

The detailed description that follows is represented largely in terms of processes and symbolic representations of operations by conventional computer components, including a processor, memory storage devices for the processor, connected display devices and input devices. Furthermore, some of these processes and operations may utilize conventional computer components in a heterogeneous distributed computing environment, including remote file servers or other repository servers, computer servers and memory storage devices.

The phrases "in one embodiment," "in various embodiments," "in some embodiments," and the like are used repeatedly. Such phrases do not necessarily refer to the same embodiment. The terms "comprising," "having," and "including" are synonymous, unless the context dictates otherwise. Such terms do not generally signify a closed list.

"Adjacent," "alternative," "automatic," "being," "both," "concerning," "consecutive," "containing," "digital," "distributed," "electrical," "fully," "functional," "having," "in common," "incremental," "inner," "leading," "least," "manifesting," "mixed," "more," "normalized," "outside," "partly," "raw," "received," "related," "relevant," "said," "second," "simultaneous," "steadily," "target," "textual," "transistor-based," "until," "various," "wearable," "wherein," "with," or other such descriptors herein are used in their normal yes-or-no sense, not as terms of degree, unless context dictates otherwise. In light of the present disclosure those skilled in the art will understand from context what is meant by "adjacent" and by other such positional descriptors used herein. Terms like "processor," "center," "unit," "computer," or other such descriptors herein are used in their normal sense, in reference to an inanimate structure. Such terms do not include any people, irrespective of their location or employment or other association with the thing described, unless context dictates otherwise. "For" is not used to articulate a mere intended purpose in phrases like "circuitry for" or "instruction for," moreover, but is used normally, in descriptively identifying special purpose software or structures.

Reference is now made in detail to the description of the embodiments as illustrated in the drawings. While embodiments are described in connection with the drawings and related descriptions, there is no intent to limit the scope to the embodiments disclosed herein. On the contrary, the intent is to cover all alternatives, modifications and equivalents. In alternate embodiments, additional devices, or combinations of illustrated devices, may be added to, or combined, without limiting the scope to the embodiments disclosed herein.

The description below includes an end-to-end process of training a machine-learning-based fashion product image classification system, using the output of that classification system to generate normalized product descriptions, indexing the generated product information into a search engine, optimizing the search engine for the fashion vertical, and a graphical user interface that allows consumers to interact with the search engine. Also included below is a method for localizing the above process to other languages.

Machine-learning-based item image classifications as described below generally include a one-off implementation commonly referred to as "training". The training data for the image classification system is generated from example products that have both images and textual metadata available. The textual metadata is pre-processed to extract relevant snippets such as "¾ sleeves" or "fit-and-flare" from unstructured paragraphs of text. The extracted snippets are mapped to a comprehensive product schema for each product category that is comprised of that category's visual and structural attributes (e.g. women's tops have attributes such as body length, sleeve length, neckline type, and the like). The image classification system is comprised of individual classifiers for each attribute of each product schema. The values of the schema properties—i.e. the text snippets described above—serve as target labels for the image classifier. The image classifiers learn which patterns in the training images correspond to which labels, so that they can predict labels for previously unseen product images.

With the trained image classification system in place, textual descriptions can be generated for any number of new—i.e. unknown to the image classification system— products. For products that do not have any pre-existing textual metadata, all product information is derived from the output of the image classification system—the labels predicted by the classifiers are mapped as values to the attributes of the product schemas described above. If a new product does have pre-existing textual metadata, that metadata is pre-processed in the same way as the textual metadata of the training products—relevant snippets are extracted from unstructured text. In cases where the extracted text data conflicts with the output from the image classification system, the product is manually reviewed to determine if the textual metadata was inaccurate, or one of the classification algorithms classified the product incorrectly. In case of the latter, the product is manually labeled with the correct class and used to re-train the image classifier to improve its accuracy. As the image classification system becomes more accurate after several iterations of re-training, it will be trusted over the external textual metadata and the manual review can happen less frequently.

Once a product's schema is populated either by the image classification system on its own, or by a combination of image classification and textual data extraction, it is used to generate a comprehensive, natural-language product description. This can be accomplished by creating a template for a syntactically correct paragraph comprised of two or three sentences. The values of the structured schema fields are plugged into the template and adjusted for correct language syntax. While a populated product schema is sufficient for search indexing and retrieval purposes, a natural language description is usually easier for humans to read, and is therefore preferential to display in the user interface on the product detail pages.

The detailed product schema generated in previous steps of the process already contains most of the information that is needed to retrieve the product via a search engine, so it can be indexed into the search engine with minimal customization. To increase recall, a synonym dictionary is generated for the values of the structured fields (e.g. "batwing sleeves" is synonymous with "dolman sleeves") and added to the index. The values of the product schema fields are not only searchable, but also serve as facets in the graphical user interface and are used as suggestions for auto-completion in the interface's search fields.

When a consumer starts typing their search in the graphical user interface, the interface suggests values of the product schema fields that match the consumer's input for auto-completion. Values from various fields of the same product schema are logically chained together to suggest more complex search queries. A second, negative search field, offers consumers the option to enter a query for attributes the consumer does not want. Once one or both search queries are entered, the search engine returns matching products from the index. To be returned as a match, all words from the query string must match either directly or as a synonym, and if provided, none of the words or synonyms of the negative query string must match. To refine the search results, the graphical user interfaces displays the facets of the index as represented by the structured schema fields and their values. Furthermore, if a consumer sees a product and wishes to see products that are visually and structurally similar, they can click a "more like this" link on the product's thumbnail, and the search results will be re-ranked to show similar products first.

The above process can be localized to different languages by mapping the values of each attribute to an idiomatic translation in the target language, as well as mapping the description generation template to a syntactically correct template in the target language. In some variants this allows a translation to be created only once for each attribute value and template, substantially reducing labor every time a new product is added.

Some variants of this process are other product verticals where images have known structural qualities, such as jewelry, home décor, furniture, art, and the like. Subsets of the process can be used as standalone processes for image description generation, and/or for building a search back-end to use with other interfaces.

FIG. 1 depicts a system 100 in which one or more entities 110A-D may interact to implement one or more technologies described herein. At least one server 300A configured via a client device 200A of the same entity 110A receives raw content 145B-D from various servers 300B-D (implemented for aggregation, e.g.) owned by respective entities 110B-D. After appropriate training and processing, a selection of the raw content 145A as well as processed data is presented (as advertisement or search results indicative of wearable items, e.g.) via a client device 200B used by a consumer.

Figure 2:
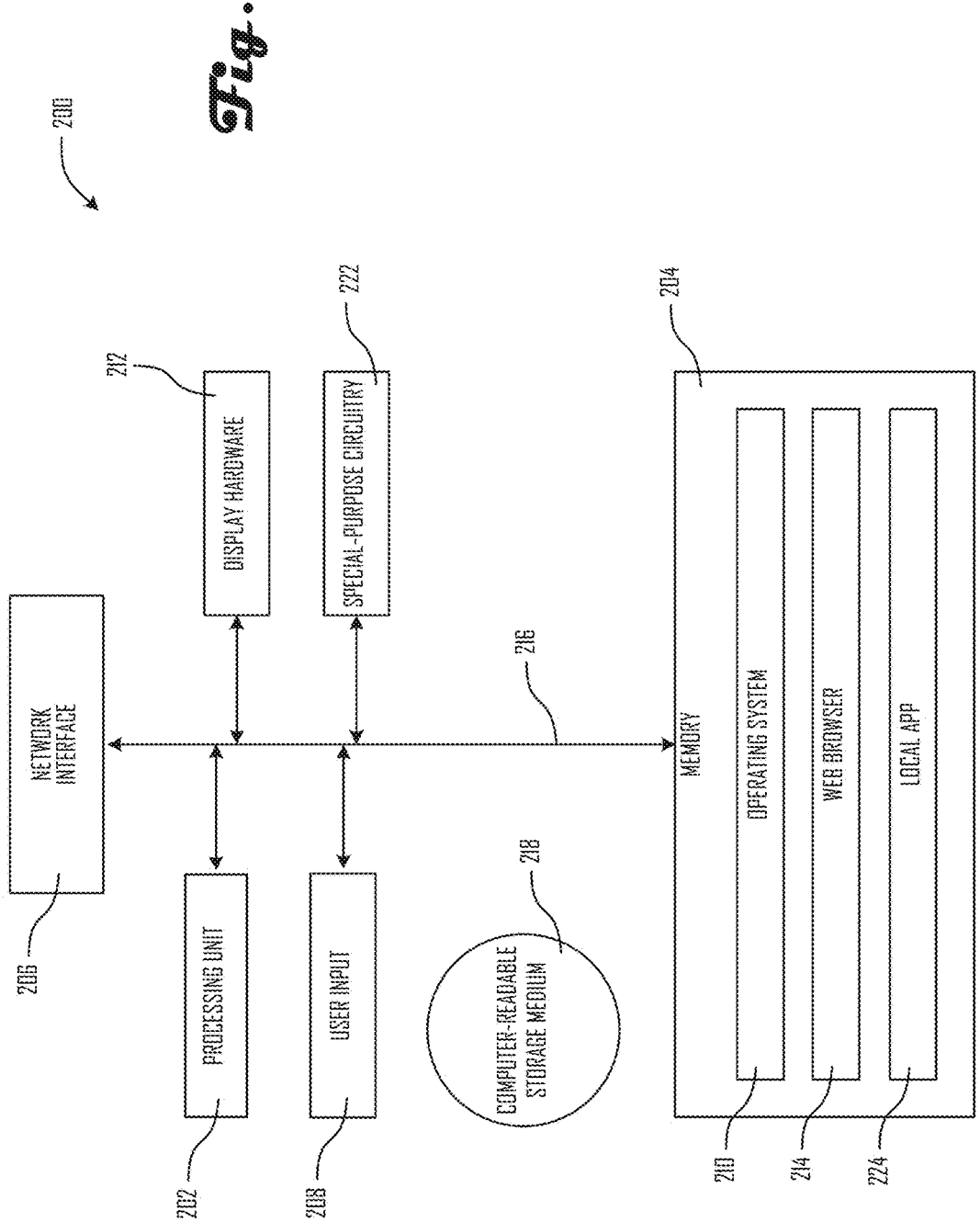
FIG. 2 depicts a client device, optionally a handheld or user-wearable article.

FIG. 2 illustrates a client device 200 in which one or more technologies may be implemented. As shown in FIG. 2, exemplary client device 200 includes one or more processing units 202 in data communication with one or more memories 204 via one or more buses 216. Each such memory 204 generally comprises some or all of random access memory (RAM), read-only memory (ROM), or a permanent mass storage device, such as a disk drive, flash memory, or the like. Client device 200 may also include one or more instances of network interfaces 206, of user inputs 208, of display hardware 212, or of speakers.

As shown, memory 204 of exemplary client device 200 may store an operating system 210, as well as program code for a number of software applications, such as a browser application 214 or a client application. Each of these is a software application by which, under client device control, client devices 200 can present data to users and transmit data from users. These and other software components, as well as various data files (not shown) may be loaded into memory 204 via network interface 206 (or via a selectively removable computer readable storage medium 220, such as a memory card or the like).

In operation, operating system 210 manages the hardware and software resources of the client device 200 and provides common services for various local apps 224 such as browser application 214. For hardware functions such as network communications via network interface 206, obtaining data via user input 208, rendering data via display hardware 212 or speakers, allocation of memory 204 to various resources, operating system 210 may act as an intermediary between software executing on client device 200 and the client device's hardware. In some contexts, for example, such hardware may include special-purpose transistor-based circuitry 222 (as described below, e.g.) that manifests one or more instances of modes 291 (of operation), of determinations 292, or of series 293 (of sequential events, e.g.) as voltage configurations.

For example, operating system 210 may cause a representation of locally available software applications, such as browser application 214, to be rendered locally (via display hardware 212, e.g.). If operating system 210 obtains, e.g. via user input 208, a selection of browser application 214, operating system 210 may instantiate a browser application process (not shown), i.e. cause processing unit 202 to begin executing the executable instructions of browser application 214 and allocate a portion of memory 204 for its use. In some contexts, downloads may require an access control feature configured to prevent unauthorized downloads and permit specially-configured client devices to access server 300. Alternatively or additionally, some functions may occur "offline" in the sense that the client device 200 is temporarily disconnected from server 300.

Although an exemplary client device 200 has been described, a client device 200 may be a mobile device or other device capable of executing program code, such as the program code corresponding to browser application 214. Alternatively or additionally, the structures described with reference to FIG. 2 may likewise be implemented by a special-purpose peer computer in a peer-to-peer network.

Figure 3:
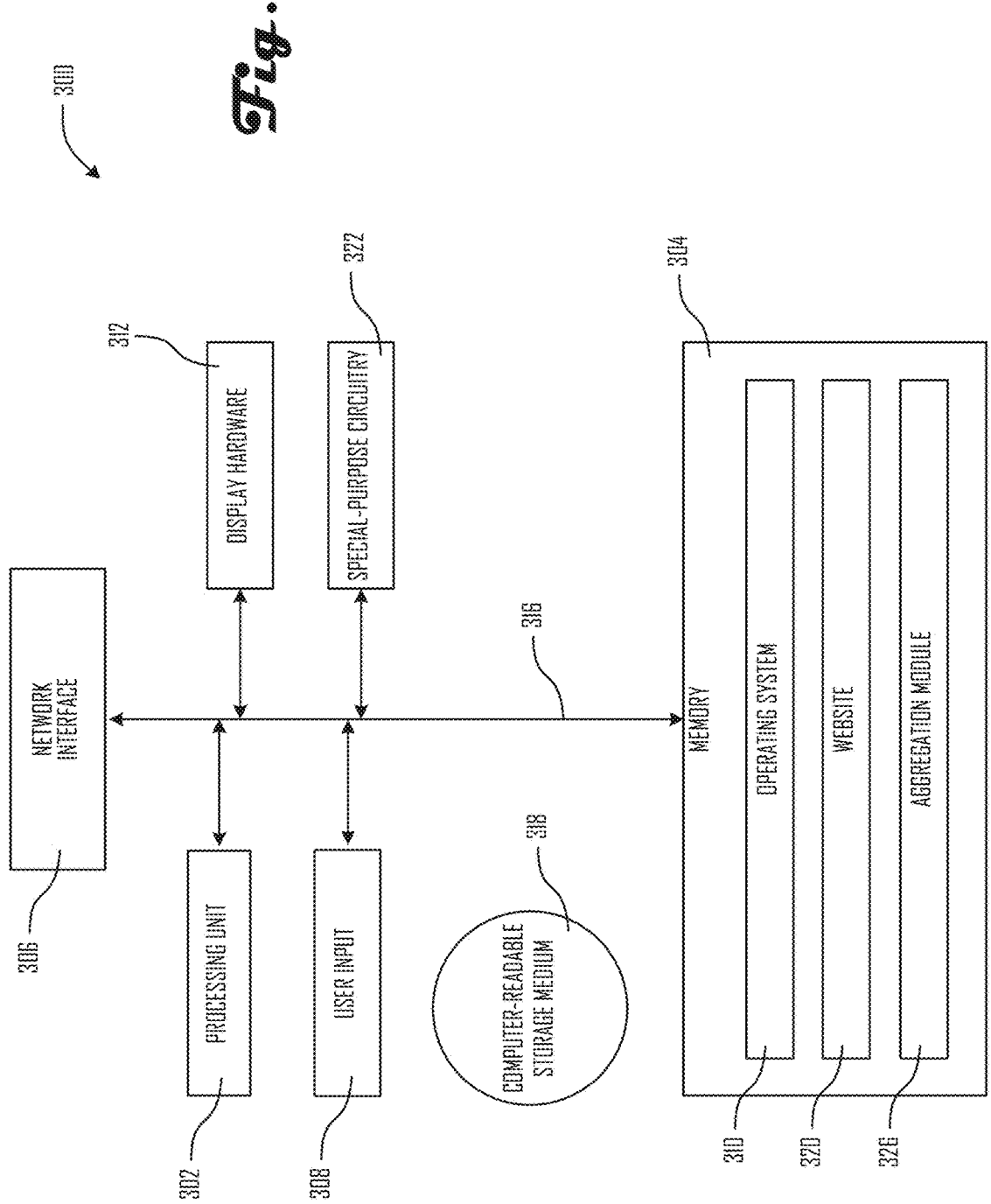
FIG. 3 depicts a server suitable for use with the present invention.

FIG. 3 illustrates a server 300 in which one or more technologies may be implemented. As shown in FIG. 3, exemplary server 300 includes one or more processing units 302 in data communication with one or more memories 304 via one or more buses 316. Each such memory 304 generally comprises some or all of random access memory (RAM), read-only memory (ROM), or a permanent mass storage device, such as a disk drive, flash memory, or the like. Server 300 may also include one or more instances of network interfaces 306, of user inputs 308, of display hardware 312, or of speakers.

As shown, memory 304 of exemplary server 300 may store an operating system 310, as well as program code for a number of software applications, such as a hosting service 314. Hosting service 314 is a software application by which client devices 200 can present data to users and transmit data from users. Alternatively or additionally, server 300 may be configured with a download service by which a special-purpose client application may be downloaded and run on client devices 200. These and other software components, as well as various data files (not shown) may be loaded into memory 304 via network interface 306 (or via a selectively removable computer readable storage medium, such as a memory card or the like).

In operation, operating system 310 manages the hardware and software resources of the server 300 and provides common services for various software applications, such as hosting service 314. For hardware functions such as network communications via network interface 306, obtaining data via user input 308, rendering data via display hardware 312 or speakers, allocation of memory 304 to various resources, operating system 310 may act as an intermediary between software executing on server 300 and the client device's hardware (including special-purpose (transistor-based) circuitry 322 as described below, e.g.).

For example, operating system 310 may cause a representation of locally available software applications, such as hosting service 314, to be rendered locally (via display hardware 312, e.g.). If operating system 310 obtains, e.g. via user input 308, a selection of hosting service 314, operating system 310 may instantiate a hosting process (not shown), i.e. cause processing unit 302 to begin executing the executable instructions of hosting service 314 and allocate a portion of memory 304 for its use. In some contexts, downloads may require an access control feature configured to prevent unauthorized downloads and permit specially-configured client devices to access server 300. Alternatively or additionally, background or preparatory processing may be facilitated by an aggregation module 326 as described herein.

Although an exemplary server 300 has been described, a server 300 may be a mobile device or other device capable of executing program code, such as the program code corresponding to a hosting service that hosts website 320. Alternatively or additionally, the structures described with reference to FIG. 3 may likewise be implemented by a special-purpose peer computer in a peer-to-peer network.

Figure 4:
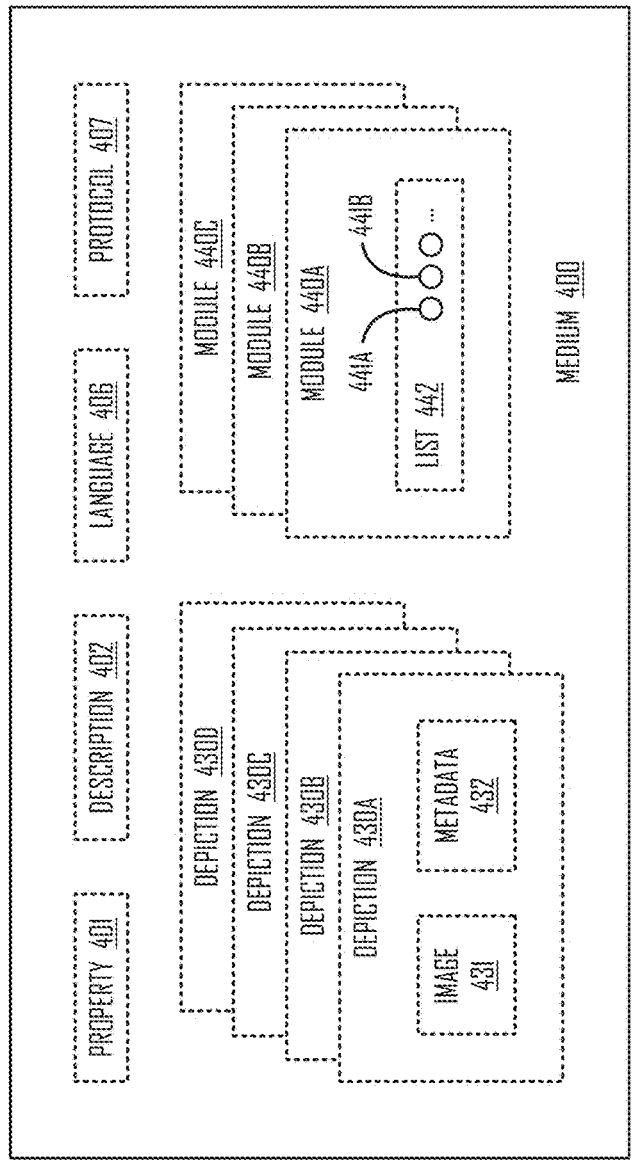
FIG. 4 depicts a non-volatile medium configured to store digital values.

FIG. 4 depicts a non-volatile medium 400 configured to store one or more digital manifestations of properties 401, of descriptions 402, of original or target languages 406, of protocols 407, of depictions 430A-D, or of other modules 440A-C. As further described below, for example, such depictions may associate an image 431 (depicting one or more wearable items, e.g.) with metadata 432. Likewise each module 440 may associate, each in a particular language 406 (English or French, e.g.) one or more lists 442 of terms 441A-B (identifying data entities and related objects as shown and described below with reference to FIGS. 5-12, e.g.).

Figure 5:
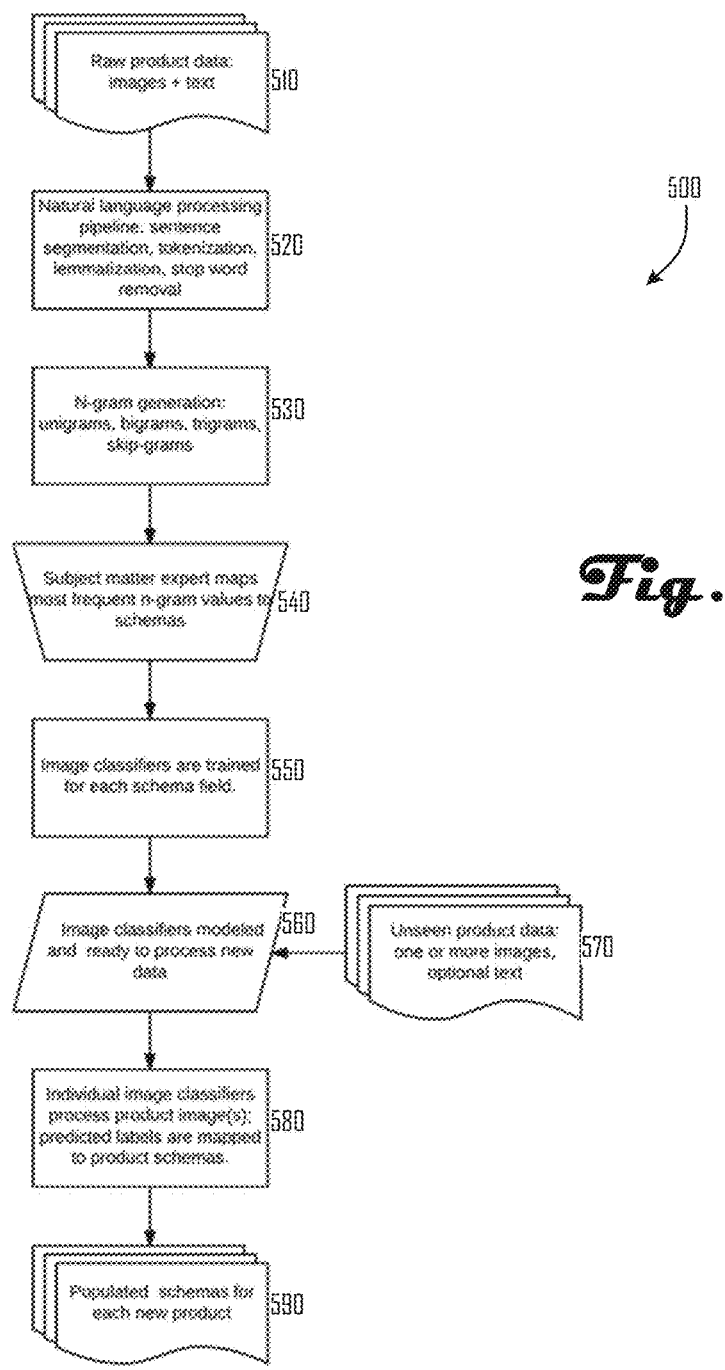
FIG. 5 depicts an image classification method.

FIG. 5 depicts an image classification method 500 that may be implemented with convolutional neural networks (CNNs). After automatically determining the most relevant image features, method 500 may likewise be implemented by layering manual feature engineering such as scale-invariant feature transform (SIFT) and a classification method such as linear regression or support vector machines.

Operation 510 represents providing the training data as input to an image classification system. To train the image classification system, the machine learning algorithm needs to be shown various examples of images and their target labels (also commonly referred to as classes or categories). To generate the training data and determine labels that most accurately and comprehensively describe an image, we examine very numerous (thousands or more) fashion retail products, the details of which are available from retailer application programming interfaces (APIs). These products, in addition to one or more images, have human-generated textual metadata. That metadata is most commonly a title and a product description in the form of unstructured text (see FIG. 6). A pipeline of natural language processing techniques is a feasible method to structure the data and extract useful information from it.

The natural language processing pipeline, represented at operation 520, comprises sentence segmentation—splitting the description into individual sentences; word tokenization—splitting each sentence into individual words and discarding punctuation; stop word removal—discarding irrelevant words such as "the", "a", and the like; and lemmatization—converting words from their inflected forms into their respective canonical forms, e.g. "sleeves" to "sleeve". From the text data processed by the natural language pipeline, n-grams of word tokens are generated to analyze frequency and co-occurrence of expressions; n-gram generation is represented at operation 530. We use unigrams (which are just individual word tokens), bigrams (two consecutive word tokens), and trigrams (three consecutive word tokens), as well two- and three-token skip-grams (word token sequences where one word is skipped, e.g. "long trumpet sleeve" becomes "long sleeve"). The most frequently occurring n-grams can be used as the basis for a structured product schema for each product type. Software libraries such as NLTK make the functionalities described above available out of the box.

Figure 7:
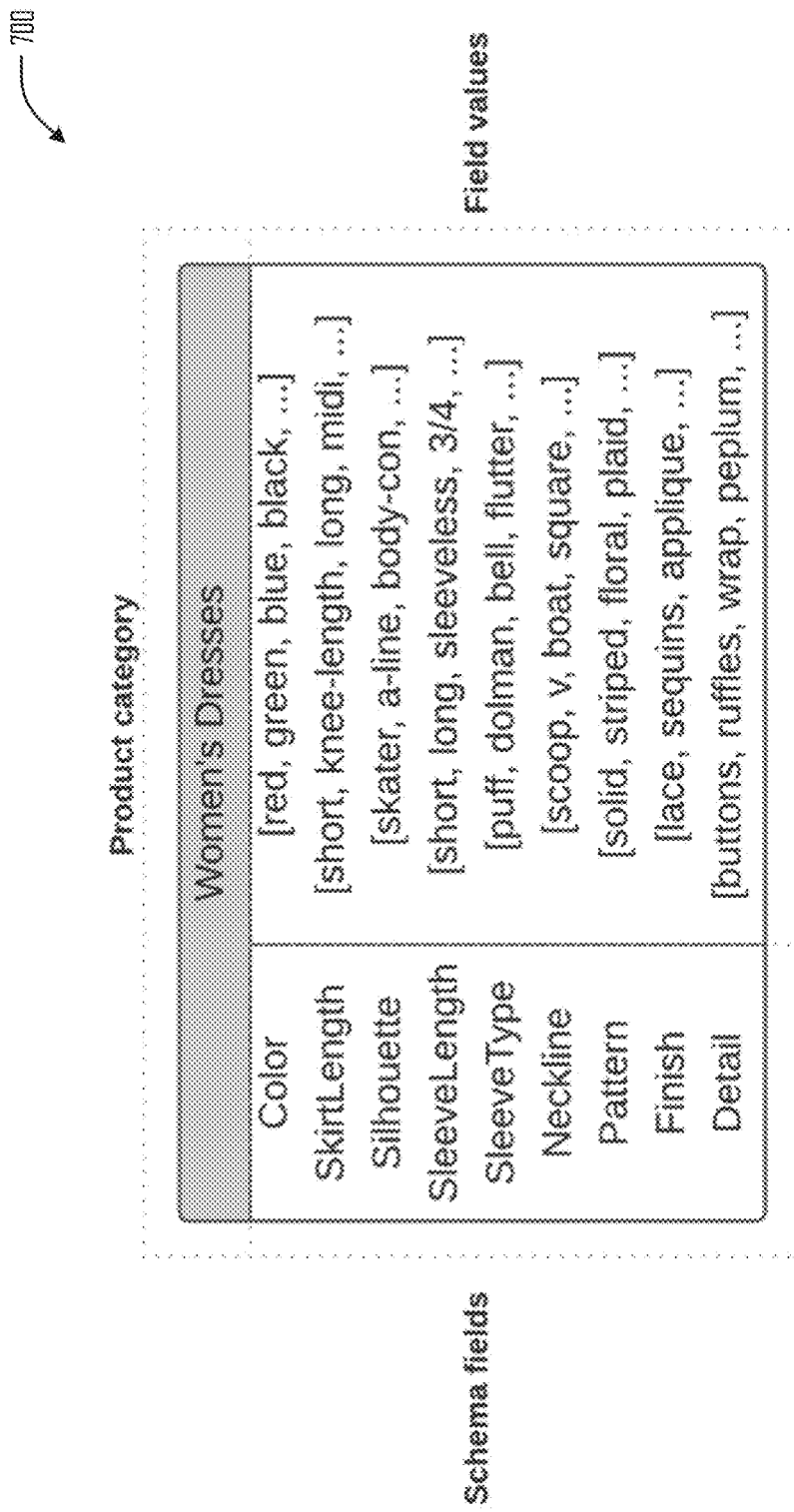
FIG. 7 illustrates a product schema.

A structured product schema can be thought of as a database schema, or as a class definition in object-oriented programming: a blueprint for how each instance of that schema/class should be structured. In some variants there is one such schema defined for every product category (e.g. women's dresses, men's shirts, and the like), and every schema contains a set of attributes (also commonly known as keys or properties) to which one of a discrete set of values is assigned. FIG. 7 illustrates an example product schema.

The product schemas are created through a mixture of human subject matter expertise, and the n-gram data generated by the natural language processing pipeline described above. As represented at operation 540, a subject matter expert examines the most frequent n-grams generated by the pipeline, identifies groupings of n-grams that refer to the same product attribute (e.g. "fit-and-flare", "sheath", and "A-line" are dress silhouette types), and maps them accordingly.

The product schemas define the structure of the image classification system. Individual classifiers are trained for every attribute of every product schema, and the discrete set of values for each attribute serve as the target labels, as represented at operation 550. The image classification training process results in the creation of classification models, represented in 560, that can take as input previously unseen images, as represented at operation 570.

Each of the trained classifiers predicts one value for one attribute of each image, as represented in at operation. The output of all classifiers combined for each product type populates the schema of each particular product, as represented at operation 590.

Figure 6:
FIG. 6 depicts a wearable item with associated descriptive matter.

FIG. 6 illustrates a linkage between a particular wearable item 650A and verbose raw content 145 most of which will not become part of any normalized wearable item depiction 430.

FIG. 7 illustrates schema fields generated in method 500. In a product category of "Women's Dresses," for example, a schema field of "Color" as shown has several field values including "red" and "green." Likewise a schema field of "SkirtLength" has several field values including "short," "knee-length," and "long" as shown.

Figure 8:
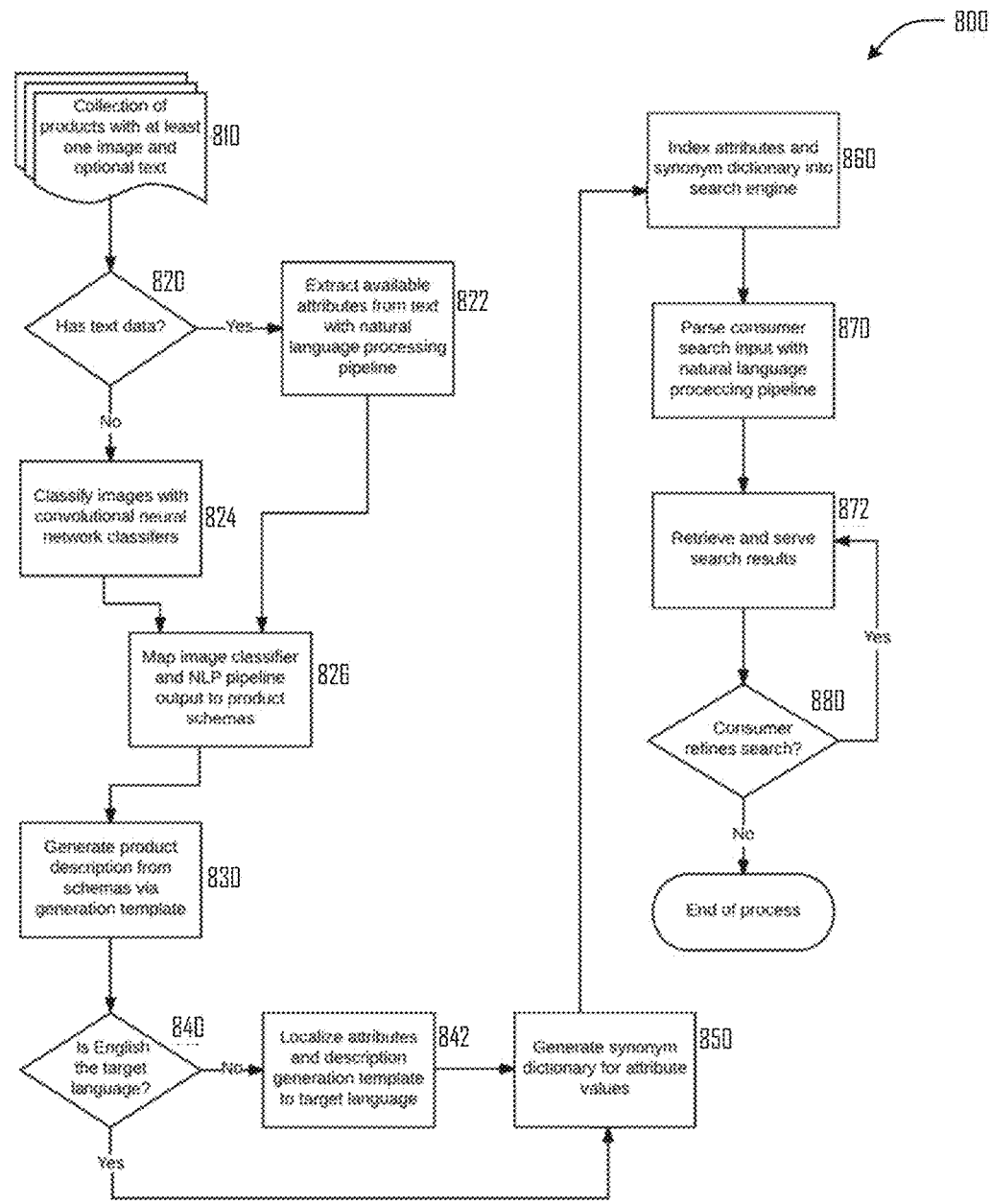
FIG. 8 shows an end-to-end workflow from product data ingestion to a graphical user interface.

With the trained image classification system in place, standardized descriptions can be generated for any number of new products. FIG. 8 shows an end-to-end workflow from product data ingestion to a graphical user interface (of a product search engine, e.g.). The end-to-end workflow takes as input raw product data in the form of a unique product identifier and, one or more product images, and optional text data, as represented at operation 810. If the incoming raw data indicates a product that only has images and no text data, as represented at operation 820, the product is sent directly to an image classification method at operation 824 (as described above, e.g.). The system makes predictions about each of the product's attributes, and the predictions are used to populate the product's data schema. If the product has text data in addition to images, it first undergoes an additional operation 822 in which the text data is sent through a natural language processing pipeline at operation 826 (as described above, e.g.) Such processing may include sentence segmentation, word tokenization, lemmatization, and n-gram generation. If any of the generated n-grams contradict any of the predictions of the image classification system the product is flagged for human (manual) review.

The two possible sources of a contradiction are either inaccurate text data or inaccurate image classification. If the source of the contradiction is identified as being one of the classifiers in the image classification system, the future accuracy of the classifier in question is improved by labeling the misclassified product with the correct class and using that data to re-train the classifier. If the source of the error is identified as being inaccurate textual data, the incorrect data is discarded. This process helps the classification system "learn from its mistakes" and steadily increase in accuracy. Once all classifiers in the image classification system reach a classification accuracy of 95% or higher, they can be trusted over the text data, and the manual review of conflicting data can occur less frequently without compromising protocol effectiveness.

Figure 9:
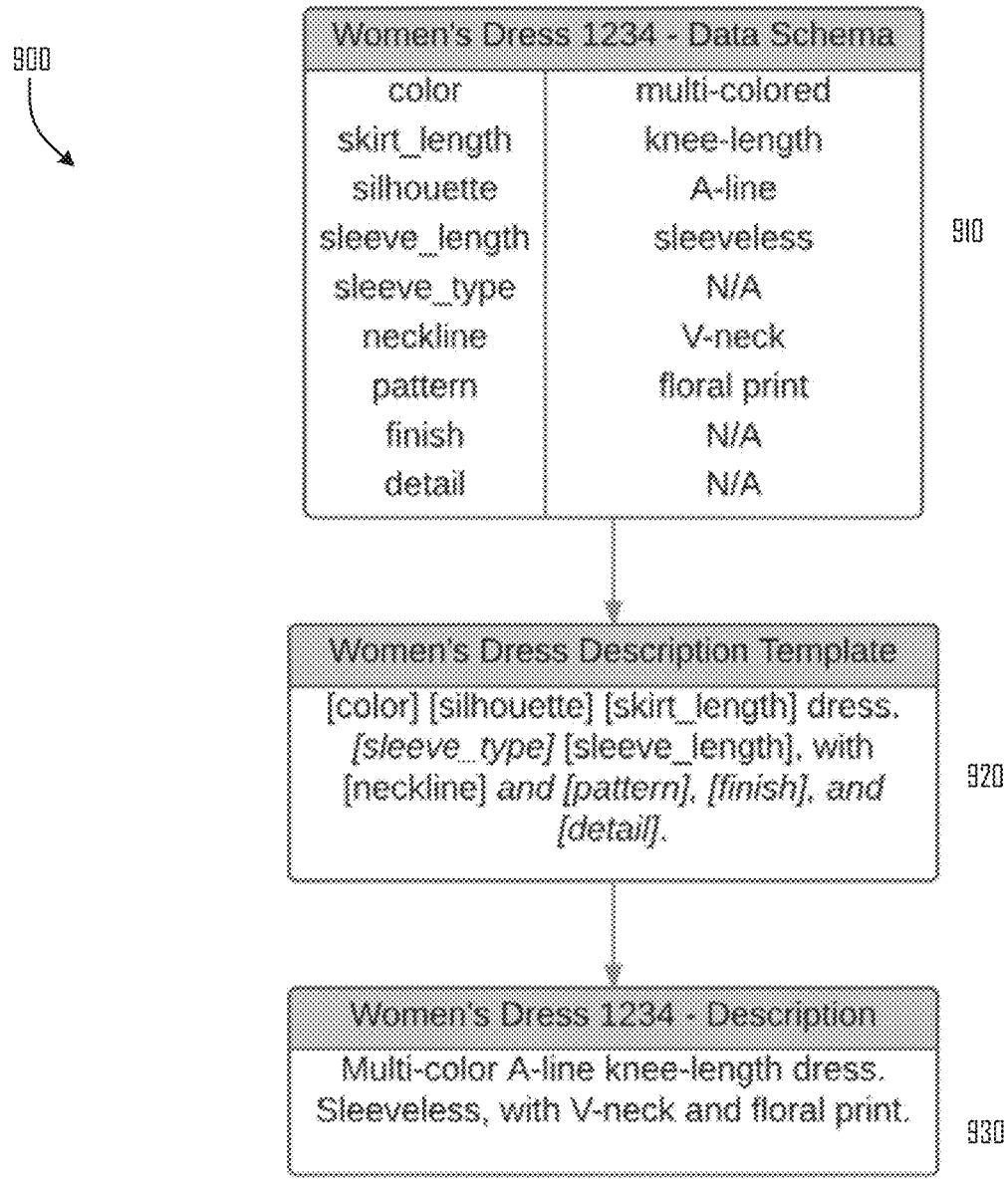
FIG. 9 illustrates another product schema.

Once a product's data schema has been populated with attribute values, a natural language description can be generated for the product, as represented at operation 830 and illustrated in detail in FIG. 9. While the schema representation is ideal for programmatic purposes, a natural language description is usually easier for a human to parse, and is therefore the customary representation in internet retail, so the generated descriptions are used in graphical user interfaces in place of the schemas. An individual product's data schema, as represented at operation 910, looks like a database entry, with a key-value representation of the product's visual attributes. The attribute values are in the form of one, two, or three lemmatized words (i.e. uni-, bi-, or trigrams), due to the natural language pre-processing pipeline described above.

As the descriptions are reasonably short—two or three sentences—and their vocabulary is limited to the attribute values in the data schema, generating them can be accomplished through a combination of paragraph templates and a few hand-coded heuristics. A paragraph template, as represented in 920, is a sequence of product attributes arranged in a way it would be in a coherent natural language paragraph, supplemented with punctuation, conjunctions, and prepositions. The hand-coded heuristics determine which attributes are mandatory and which are optional, and provide alternative sentence/paragraph structures depending on which attributes are and are not populated. Contrasting the automatically generated paragraph in 930—"Multi-color A-line knee-length dress. Sleeveless, with V-neck and floral print."—with the original product description in FIG. 6—"Made in a pretty primary-colored floral print for the ultimate pop, this dress is perfect for all those fun warm-weather occasions—think showers, brunches and summer parties", it becomes clear to the system that the visual classification process has added the skirt length, sleeve length, and neckline attributes that previously weren't present in the product's textual metadata, and therefore would not have matched search queries for the specific attribute values "knee-length", "sleeveless", or "v-neck". The natural language description is generated regardless of whether textual metadata was previously available, so this process can be used to generate descriptions from images and eliminate the manual writing process entirely.

The natural language descriptions generated by the description generation process can be localized to other languages with much less effort than is needed to translate manually written descriptions of every product. The attributes and values of each product schema would have to be translated once into idiomatic fashion terminology in the target language, and the sentence/paragraph template would have to be adapted syntactically and idiomatically to the target language. With those configurations in place, all product descriptions can be localized automatically by selecting one or more target languages at the description generation stage, as represented at operations 840 and 842.

The parts of the end-to-end process described above can comprise a standalone image description generation system that can be employed in various embodiments in the e-commerce and information retrieval spaces. This document continues with a description of a consumer-facing fashion search engine that uses the above steps as the back-end.

To be able to search for data effectively and with complex logic, the process requires that the product schema data is indexed in a database that offers advanced search functionality, such as Elasticsearch, Apache Solr, and the like. While such a database can hold any kind of textual data, structured or unstructured, and offers text processing tools such as tokenization, lemmatization, and fuzzy search (i.e. misspelling correction), it does not have any pre-existing knowledge about any particular search vertical, in this case fashion retail. As the language of fashion products is much more varied and editorial than the language of electronics, appliances, tools, or similar products, to create a comprehensive and accurate fashion retail search solution requires the addition of synonyms. Examples of synonymous terms in fashion is "skater dress" and "fit-and-flare dress", "long dress" and "maxi dress", and "dolman sleeves" and "batwing sleeves". In this process, a custom synonym dictionary is created by a subject matter expert who analyzes the less frequent n-grams generated by the natural language pipeline described above, and maps those to the more frequent n-grams that they're equivalent to, as represented at operation 850. The product schema data and synonym dictionary are indexed into a search engine, as represented at operation 860, enabling engine to retrieve all products that are visually relevant to the search query, regardless of whether the search query contains the primary value or the synonym. Search queries are parsed by going through the same natural language pipeline as the training data described above—tokenization, lemmatization, and n-gram generation, as represented at operation 870—so that it perfectly matches the structure of the product data. General search engines such as Google, Bing, Yahoo, and the like, as well as retailer-specific search engines such as Nordstrom, Macy's, Neiman Marcus, and the like, by default return all search results that match any part of the search query. However, in fashion retail, that approach returns a large number of unwanted results. Since consumers only review a relatively small number of products, and abandon their search thereafter, this search engine by default returns results that match all parts of the search query. This helps the consumers find the "needle in the haystack" among a large number of available products. Products that match the full search query are retrieved and served in the graphical user interface, as represented at operation 872.

Figure 10:
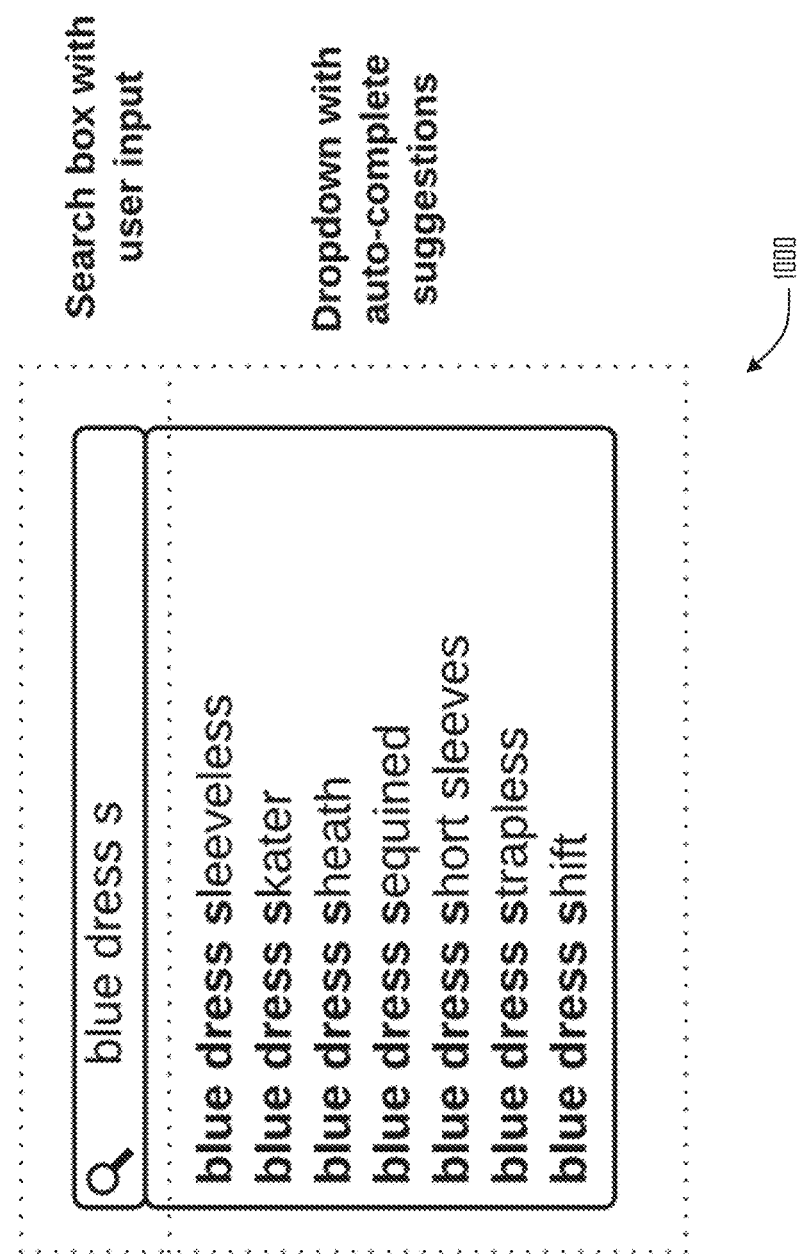
FIG. 10 illustrates an example of auto-completion suggestions in a search box at a user interface.

In addition to being used in search and retrieval, the schema attributes and synonyms are also used to generate suggestions for automatic completion of a search query. The benefits of this method are two-fold. First, generating auto-completion suggestions from the searchable index data eliminates the need for user-generated search queries—those require a certain amount of time and a critical mass of users to collect. Secondly, while many consumers can clearly visualize their desired attributes, they are not certain which terminology to use for the more specific attributes. In this process the search engine graphical user interface displays suggestions that combine the user input with the attribute values that are most commonly collocated with the input values. FIG. 10 illustrates an example of the auto-completion suggestions in a search box at a user interface 1000 (of a client device 200, e.g.).

The schema attributes are further used to display facets in the search engine graphical user interface. Using the facets, the consumer can narrow down the number of products returned by their initial search, as represented at operation 880. If the consumer activates any faces, those facets are added to the original search query, and the search engine repeats at operation 872, retrieving results that match the new query. Otherwise the method 800 ends.

Figure 11:
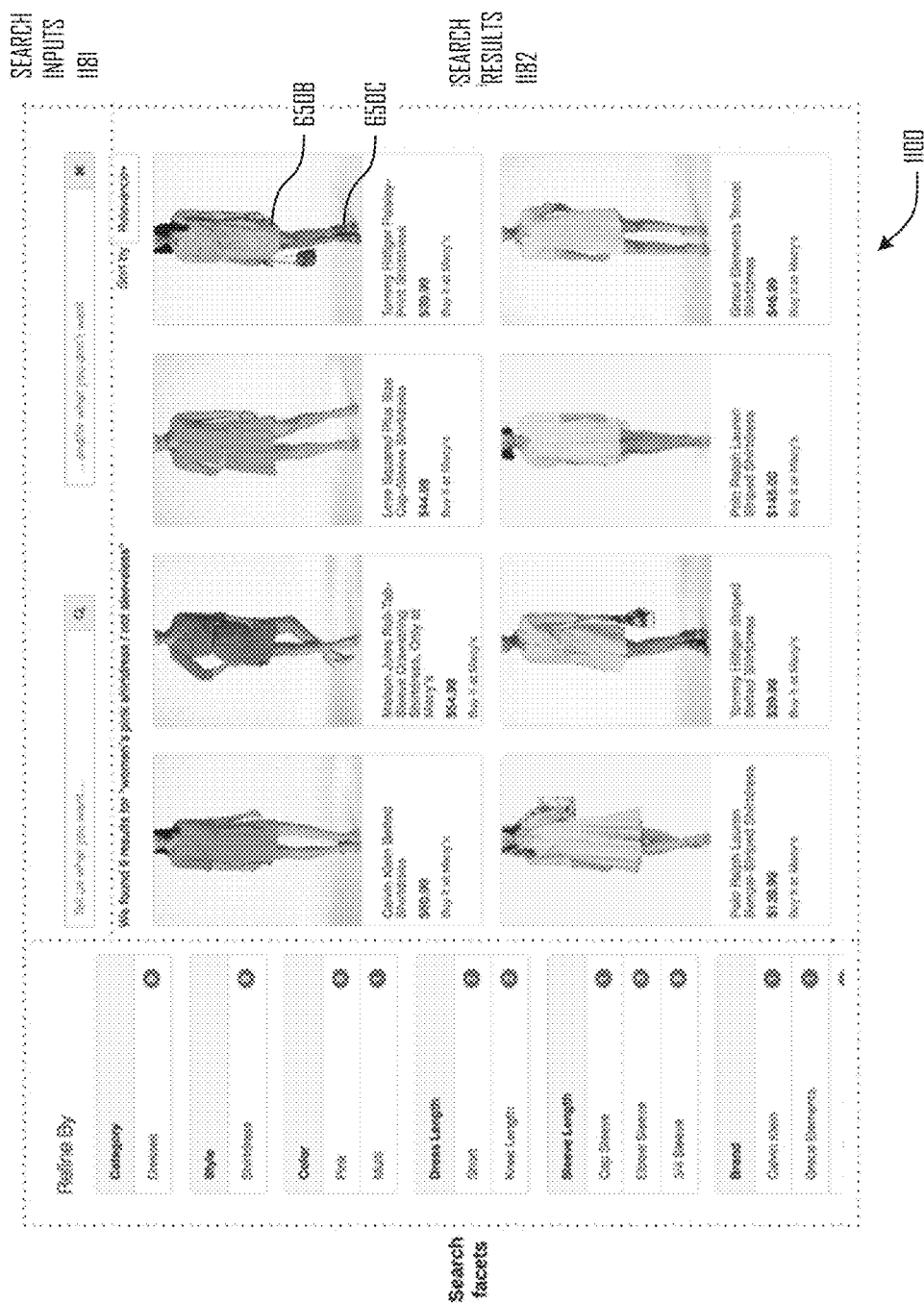
FIG. 11 illustrates an example search results page.

FIG. 11 illustrates an example search results page 1100 with facets and also illustrates an additional wearable item 650B (a shirtdress) in conjunction with another wearable item 650C (a pair of shoes) both in a common image.

Figure 12:
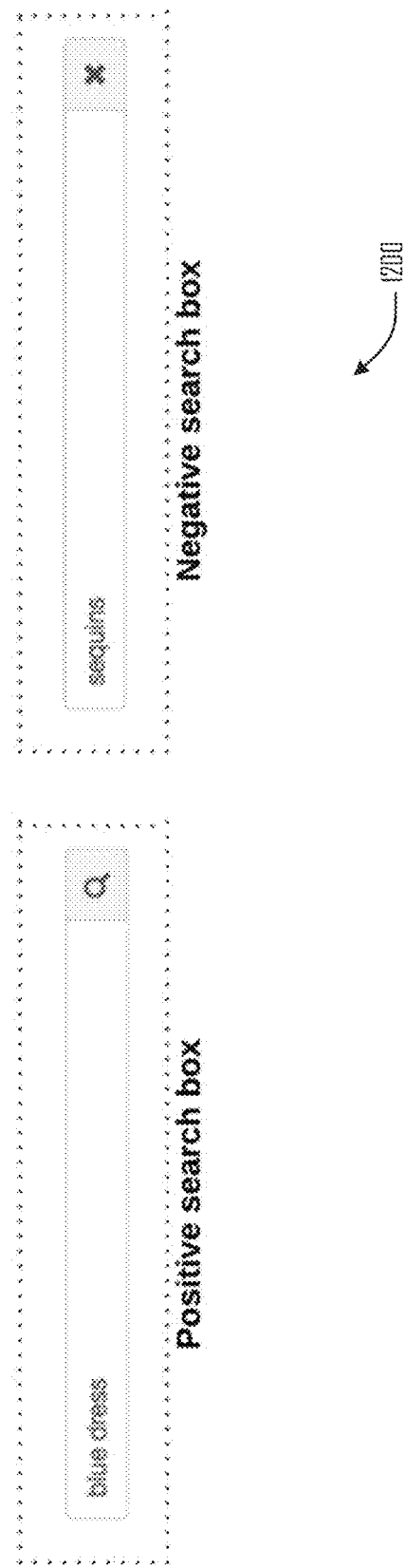
FIG. 12 illustrates two search inputs side by side at a user interface.

In regard to fashion and style preferences, many consumers not only have attributes they are interested in, but also attributes they are not interested in and want to exclude. To that end, the search engine's graphical user interfaces includes a second, "negative" search input, that allows consumers to exclude certain keywords or phrases from the search results. The second search input has the same auto-completion functionality as the first, "positive" one, but its logic differs in that products that match any of unwanted attributes are excluded. This enables the consumer to quickly narrow down the number of relevant products. FIG. 12 illustrates two search inputs side by side at a user interface 1200 (of a client device 200, e.g.).

In addition to the search and faceting functionalities described above, the search functionality offers consumers the option to narrow down the number of products returned by the search engine for a particular query and/or faceting filters by asking to see products that are similar to a particular product. Similar products can be retrieved by using a clustering algorithm that takes one product's images and schema attribute values as input and returns a specified number of products that most closely match the input product. The proximity of the clustering algorithm combined with the specificity of the search and faceting can narrow down the number of relevant product exponentially faster than either of the methods on its own.

FIG. 13 depicts a wearable-item-descriptive content handling method 1300 suitable for use with at least one embodiment, such as a server 300 having special-purpose transistor-based circuitry. As will be recognized by those having ordinary skill in the art, not all events of image display are illustrated in FIG. 13. Rather, for clarity, only those steps reasonably relevant to describing the data handling and user interaction aspects of interactive graphical display routine 1300 are shown and described. Those having ordinary skill in the art will also recognize the present embodiment is merely one exemplary embodiment and that variations on the present embodiment may be made without departing from the scope of the broader inventive concepts set forth herein.

Operation 1310 describes obtaining numerous (i.e. hundreds or more of) normalized wearable item depictions pertaining to a first target language from a machine-learning-based image classification protocol that was trained using very numerous (i.e. thousands or more of) wearable item depictions that each associate one or more graphical images with corresponding textual metadata (a first module of special-purpose circuitry 322 obtaining numerous normalized wearable item depictions 430 pertaining to a first target language 406 from a machine-learning-based image classification protocol 407 that was trained using very numerous wearable item depictions 430 that each associate one or more graphical images 431 with corresponding textual metadata 432, e.g.). This can occur, for example, in a context in which each of such normalized wearable item depictions 430 pertaining to the first target language 406 associates one or more wearable-item-depictive visible properties 401 with one or more wearable-item-depictive textual descriptions 402 of the corresponding textual metadata 432; in which these and other wearable item depictions reside in computer-readable storage medium 31; and in which such training is not humanly possible (i.e. without computer assistance). In some contexts, for example, the training related to operation 1310 may all have occurred within a single week, which requires one or more computers by virtue of the sheer volume of depictions required to be processed. Moreover such training may be performed with far less than a week of human effort once the system 100 is configured, even if the machine learning protocol is performed upon millions of wearable item depictions.

Operation 1320 describes configuring a first functional module by indexing the numerous normalized wearable item depictions pertaining to the first target language into the first functional module so that the first functional module applies a wearable item relevance protocol as an automatic and conditional response partly based on the first raw content matching any of the numerous normalized wearable item depictions and partly based on the second raw content not matching any of the numerous normalized wearable item depictions (a second module of special-purpose circuitry 322 performing such configuration by indexing the numerous normalized wearable item depictions 430 pertaining to the first target language into the first functional module 440 so that the first functional module 440 applies a wearable item relevance protocol 407 as an automatic and conditional response partly based on the first raw content 145 matching any of the numerous normalized wearable item depictions 430 and partly based on the second raw content 145 not matching any of the numerous normalized wearable item depictions 430, e.g.). This can occur, for example, in a context in which the first and second raw content 145 are components of raw data processed by the first functional module 440.

Operation 1330 describes transmitting at least some of the first raw content as an automatic and conditional response partly based on the first raw content matching any of the numerous normalized wearable item depictions and partly based on the second raw content not matching any of the numerous normalized wearable item depictions 430 (a third module of special-purpose circuitry 322 performing such transmitting selectively as an automatic and conditional response partly based on an element of the first raw content matching one of the numerous normalized wearable item depictions 430 and partly based on the second raw content not matching any of the numerous normalized wearable item depictions 430, e.g.). This can occur, for example, in a context in which such transmission triggers a presentation of an output (a suggestion or search result, e.g.) via display hardware 212 of a client device 200 belonging to a consumer whose search or purchase history is known and taken into account at server 300A (in performing operation 1320, e.g.).

As used herein, a "normalized" depiction is one that combines at least one graphical component with at least one textual component. As used herein, a "graphical component" of an item depiction (a photograph or sketch, e.g.) may include a dimension or other visible aspect of item size, a hue or other aspect of color or shade, a dimensional ratio or other visible aspect of item shape, a viewing angle or other visible aspect of item orientation, a logo or other emblem printed on or otherwise attached to the wearable item, a visually apparent texture or other visible pattern (of swirls or stripes, e.g.), a visibly-evident item provenance (a shape characteristic of a manufacturer or country of origin, e.g.), a photograph or other image in which the wearable item is visible, or any two or more of the foregoing both/all pertaining either to a single wearable article or to a single wearable product. Likewise a "textual component" of an item depiction may include a product name (a SKU, e.g.) or alias thereof, an item subcomponent type identifier ("SHORT SLEEVE" or "ZIPPER" or a similar label pertaining only to a part of a wearable article or product, e.g.), an alphanumeric size or item shape identifier ("LARGE" or "TAPERED," e.g.), an item depiction type identifier ("SIDE VIEW" or a similar textual label pertaining only to a particular image of a wearable article or product, e.g.), a hue identifier ("BROWN" or a similar textual label pertaining only to a particular wearable item or part thereof, e.g.), a shade identifier ("DARK" or a similar textual label pertaining only to a particular wearable item or part thereof, e.g.), a visibly-evident identification of an item provenance (a manufacturer name like "NIKE" or geographical identifier like "NY," e.g.), or any two or more of the foregoing both/all pertaining either to a single wearable article or to a single wearable product. In some variants a "normalized" depiction may include other components also, such as a language or dialect identifier (or a corresponding target regional identifier) of each textual component.

In light of teachings herein, numerous existing techniques may be applied for configuring special-purpose circuitry or other structures effective for facilitating machine learning in item categorization without undue experimentation or for configuring other decisions and devices as described herein. See, e.g., U.S. Pat. No. 9,720,570 ("Dynamic sorting and inference using gesture based machine learning"); U.S. Pat. No. 9,684,838 ("Empirical data modeling"); U.S. Pat. No. 9,471,853 ("Method and apparatus for image processing"); U.S. Pat. No. 9,390,348 ("Method for categorizing objects in image"); U.S. Pat. No. 8,812,417 ("Hierarchical based sequencing machine learning model"); U.S. Pat. No. 8,788,439 ("Instance weighted learning machine learning model"); U.S. Pub. No. 2017/0235824 ("Semantic category classification"); U.S. Pub. No. 2017/0213112 ("Utilizing deep learning for automatic digital image segmentation and stylization"); U.S. Pub. No. 2017/0132510 ("Identifying Content Items Using a Deep-Learning Model"); U.S. Pub. No. 2017/0091617 ("Incident prediction and response using deep learning techniques and multimodal data"); U.S. Pub. No. 2017/0046733 ("System and method for improving image-based advertisement success"); U.S. Pub. No. 2016/0259980 ("Systems and methodologies for performing intelligent perception based real-time counting"); U.S. Pub. No. 2015/0379571 ("Systems and methods for search retargeting using directed distributed query word representations"); and U.S. Pub. No. 2015/0332121 ("Method and apparatus for image processing"). All of the patents and other publications referred to above are incorporated herein by reference in their entirety—including those identified in relation to particular new applications of existing techniques—to the extent not inconsistent herewith.

With respect to the numbered clauses and claims expressed below, those skilled in the art will appreciate that recited operations therein may generally be performed in any order. Also, although various operational flows are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise. Also in the numbered clauses below, specific combinations of aspects and embodiments are articulated in a shorthand form such that (1) according to respective embodiments, for each instance in which a "component" or other such identifiers appear to be introduced (with "a" or "an," e.g.) more than once in a given chain of clauses, such designations may either identify the same entity or distinct entities; and (2) what might be called "dependent" clauses below may or may not incorporate, in respective embodiments, the features of "independent" clauses to which they refer or other features described above.

CLAUSES 1. (Independent) A wearable-item-descriptive content handling system 100 comprising:

transistor-based circuitry (in one or more instances of special-purpose circuitry 322, e.g.) configured to obtain numerous (i.e. hundreds or more of) normalized wearable item depictions 430 pertaining to a first target language 406 from a machine-learning-based image classification protocol 407 that was trained using very numerous (i.e. thousands or more of) wearable item depictions 430 that each associate one or more graphical images 431 with corresponding textual metadata 432, wherein each of the normalized wearable item depictions 430 pertaining to the first target language 406 associates one or more wearable-item-depictive visible properties 401 with one or more wearable-item-depictive textual descriptions 402 of the corresponding textual metadata 432;

transistor-based circuitry configured to configure a first functional module 440 (in an instance of special-purpose circuitry 322, e.g.) by indexing the numerous normalized wearable item depictions 430 pertaining to the first target language into the first functional module 440 so that the first functional module 440 applies a wearable item relevance protocol 407 as an automatic and conditional response partly based on the first raw content 145 matching any of the numerous normalized wearable item depictions 430 and partly based on the second raw content 145 not matching any of the numerous normalized wearable item depictions 430, wherein the first and second raw content are components of raw data processed by the first functional module 440; and transistor-based circuitry (in one or more instances of special-purpose circuitry 322, e.g.) configured to transmit at least some of the first raw content 145 as an automatic and conditional response partly based on the first raw content matching any of the numerous normalized wearable item depictions 430 and partly based on the second raw content not matching any of the numerous normalized wearable item depictions 430.

2. The system of any of the SYSTEM CLAUSES above, wherein the transistor-based circuitry all resides in a single server.

3. The system of any of the SYSTEM CLAUSES above, wherein the transistor-based circuitry all resides in a single common Application Specific Integrated Circuit (ASIC).

4. The system of any of the SYSTEM CLAUSES above, configured to perform one of the methods described below.

5. The system of any of the SYSTEM CLAUSES above, further comprising:

a detection module (in an instance of special-purpose circuitry 322, e.g.) configured to determine that the first raw content matches an element of the numerous normalized wearable item depictions 430 and that the second raw content does not match any element of the numerous normalized wearable item depictions 430.

6. (Independent) A wearable-item-descriptive content handling method comprising:

invoking transistor-based circuitry (in one or more instances of special-purpose circuitry 322, e.g.) configured to obtain numerous (i.e. hundreds or more of) normalized wearable item depictions 430 pertaining to a first target language 406 from a machine-learning-based image classification protocol 407 that was trained using very numerous (i.e. thousands or more of) wearable item depictions 430 that each associate one or more graphical images 431 with corresponding textual metadata 432, wherein each of the normalized wearable item depictions 430 pertaining to the first target language 406 associates one or more wearable-item-depictive visible properties 401 with one or more wearable-item-depictive textual descriptions 402 of the corresponding textual metadata 432;

invoking transistor-based circuitry configured to configure a first functional module 440 (in an instance of special-purpose circuitry 322, e.g.) by indexing the numerous normalized wearable item depictions 430 pertaining to the first target language into the first functional module 440 so that the first functional module 440 applies a wearable item relevance protocol 407 as an automatic and conditional response partly based on the first raw content 145 matching any of the numerous normalized wearable item depictions 430 and partly based on the second raw content 145 not matching any of the numerous normalized wearable item depictions 430, wherein the first and second raw content are components of raw data processed by the first functional module 440; and transmitting at least some of the first raw content 145 (to display hardware 212 of a client device 200 in use by a consumer, e.g.) as an automatic and conditional response partly based on the first raw content matching any of the numerous normalized wearable item depictions 430 and partly based on the second raw content not matching any of the numerous normalized wearable item depictions 430.

7. The method of any of the METHOD CLAUSES above, wherein the transmitting at least some of the first raw content 145 comprises:

causing an output of a search result to display hardware 212 of a client device 200, wherein the output includes a portion of the first raw content but does not include any of the second raw content.

8. The method of any of the METHOD CLAUSES above, wherein the transmitting at least some of the first raw content 145 comprises:

causing an output of a search result to display hardware 212 of a client device 200 as a search result generated by a search engine in response to a search query including one or more search criteria, wherein the output includes a portion of the first raw content but does not include any of the second raw content.

9. The method of any of the METHOD CLAUSES above, wherein a detection module prioritizes the first raw content over the second raw content (by selectively excluding the second raw content or giving it a lower rank, e.g.) in response to a determination that the first raw content matches an element of the numerous normalized wearable item depictions and that the second raw content does not match any element of the numerous normalized wearable item depictions.

10. The method of any of the METHOD CLAUSES above, wherein the configuring the first functional module 440 by indexing the numerous normalized wearable item depictions pertaining to the first target language into the first functional module 440 comprises:

forming a first information vector by quantifying several visual aspects of a first wearable item 650 in a first normalized wearable item depiction 430 of the numerous normalized wearable item depictions, wherein the first raw content includes the several visual aspects of the first wearable item 650;

forming a second information vector by quantifying several visual aspects of a second wearable item 650 in a second normalized wearable item depiction 430 of the numerous normalized wearable item depictions, wherein the second raw content includes the several visual aspects of the second wearable item 650;

forming a third information vector by quantifying several visual aspects of a third wearable item 650 in a third normalized wearable item depiction 430 of the numerous normalized wearable item depictions, wherein the third raw content includes the several visual aspects of the third wearable item 650;

forming an other information vector by quantifying several visual aspects of an other wearable item 650 in an other normalized wearable item depiction 430 of the numerous normalized wearable item depictions, wherein the other raw content includes the several visual aspects of the other wearable item 650; and periodically presenting via a user device to a user (in a periodic promotion that occurs every N months for example, where N>2) as an automatic and conditional response partly based on a determination that an available inventory of the third wearable item 650 has become available and partly based on a determination that a divergence (a variance or similar scalar computation signifying a quantifiable difference, e.g.) between the third information vector and the other information vector is smaller than a threshold, wherein one or more records indicate that the other wearable item 650 has previously been presented to the user (in a sales record indicating that the user has purchased the other wearable item 650 more than one month previously, e.g.).

11. The method of any of the METHOD CLAUSES above, wherein the configuring the first functional module 440 by indexing the numerous normalized wearable item depictions 430 pertaining to the first target language into the first functional module 440 comprises:

forming a first information vector by quantifying several visual aspects of a first wearable item 650 in a first normalized wearable item depiction 430 of the numerous normalized wearable item depictions, wherein the first raw content includes the several visual aspects of the first wearable item 650;

forming a second information vector by quantifying several visual aspects of a second wearable item in a second normalized wearable item depiction 430 of the numerous normalized wearable item depictions, wherein the second raw content includes the several visual aspects of the second wearable item 650;

forming an other information vector by quantifying several visual aspects of an other wearable item 650 in an other normalized wearable item depiction 430 of the numerous normalized wearable item depictions, wherein the other raw content includes the several visual aspects of the other wearable item 650;

responding to a determination that an available inventory of the first wearable item is presently exhausted by presenting via a mobile device 200 a selective suggestion of the other wearable item partly based on a determination that an available inventory of the other wearable item 650 is not presently exhausted and partly based on a determination that a divergence (a variance or similar scalar computation signifying a quantifiable difference, e.g.) between the other information vector and the first information vector is smaller than a threshold.

12. The method of any of the METHOD CLAUSES above, wherein the configuring the first functional module 440 by indexing the numerous normalized wearable item depictions pertaining to the first target language into the first functional module 440 comprises:

forming a first information vector by quantifying several visual aspects of a first wearable item 650 in a first normalized wearable item depiction 430 of the numerous normalized wearable item depictions, wherein the first raw content includes the several visual aspects of the first wearable item 650;

forming a second information vector by quantifying several visual aspects of a second wearable item 650 in a second normalized wearable item depiction 430 of the numerous normalized wearable item depictions, wherein the second raw content includes the several visual aspects of the second wearable item 650; and automatically determining that the first wearable item is more relevant than the second wearable item by determining that a divergence between the first information vector and an ideal vector is smaller than a divergence between the second information vector and the ideal vector.

13. The method of any of the METHOD CLAUSES above, wherein the configuring the first functional module 440 by indexing the numerous normalized wearable item depictions pertaining to the first target language into the first functional module 440 comprises:

grouping first and second products depicted in respective ones of the numerous normalized wearable item depictions; and presenting predictive content (a sales trend or inventory forecast, e.g.) relating to the first product in association with the second product in response to the grouping of the first and second products depicted in the respective ones of the numerous normalized wearable item depictions.

14. The method of any of the METHOD CLAUSES above, wherein the configuring the first functional module 440 by indexing the numerous normalized wearable item depictions pertaining to the first target language into the first functional module 440 comprises:

presenting one or more brand-specific depictions of the numerous normalized wearable item depictions pertaining to the first target language combined with corresponding brand information so that a resulting vector thereof can be used to facilitate pricing of new wearable items (as they are added to a retailer's inventory and thereby facilitate a verification of consistent pricing among other items of the same brad and with the same or very similar visual attributes, e.g.).

15. The method of any of the METHOD CLAUSES above, wherein the configuring the first functional module 440 by indexing the numerous normalized wearable item depictions pertaining to the first target language into the first functional module 440 comprises:

placing keywords pertaining to a wearable item on a detail page so that said keywords are indexed into a general search engine (Google or Bing, e.g.).

16. The method of any of the METHOD CLAUSES above, wherein the configuring the first functional module 440 by indexing the numerous normalized wearable item depictions pertaining to the first target language into the first functional module 440 comprises:

automatically evaluating a retail display ad according to how many terms in the retail display ad match keywords in a list of keywords extracted from the numerous normalized wearable item depictions.

17. The method of any of the METHOD CLAUSES above, wherein the configuring the first functional module 440 by indexing the numerous normalized wearable item depictions pertaining to the first target language into the first functional module 440 comprises:

automatically translating the numerous normalized wearable item depictions pertaining to the first target language into multiple other target languages, wherein at least some of the first raw content that has been automatically translated is transmitted in the multiple target languages without any post-translation human review.

18. The method of any of the METHOD CLAUSES above, comprising:

comparing a target-language-specific list 442 of wearable-item-related terms 441 with the textual metadata 432 in a first depiction 430A of the numerous normalized wearable item depictions 430 as a pre-processing component of extracting a relevant textual snippet (a term 441A, e.g.) in the first target language 406 from the first depiction 430 of the numerous normalized wearable item depictions 430.

19. The method of any of the METHOD CLAUSES above, comprising:

implementing one or more operations as shown or described with reference to FIG. 5.

20. The method of any of the METHOD CLAUSES above, comprising:

implementing one or more objects (images or terms, e.g.) as shown or described with reference to FIG. 6.

21. The method of any of the METHOD CLAUSES above, comprising:

implementing one or more objects (fields or values, e.g.) as shown or described with reference to FIG. 7.

22. The method of any of the METHOD CLAUSES above, comprising:

implementing one or more operations (conditional actions or other decisions, e.g.) as shown or described with reference to FIG. 8.

23. The method of any of the METHOD CLAUSES above, comprising:

implementing one or more objects (schemas or templates, e.g.) as shown or described with reference to FIG. 9.

24. The method of any of the METHOD CLAUSES above, comprising:

implementing one or more objects (search boxes or suggestions, e.g.) as shown or described with reference to FIG. 10.

25. The method of any of the METHOD CLAUSES above, comprising:

implementing one or more objects (search inputs or results, e.g.) as shown or described with reference to FIG. 11.

26. The method of any of the METHOD CLAUSES above, comprising:

implementing one or more objects (search boxes or terms, e.g.) as shown or described with reference to FIG. 12.

While various system, method, article of manufacture, or other embodiments or aspects have been disclosed above, also, other combinations of embodiments or aspects will be apparent to those skilled in the art in view of the above disclosure. The various embodiments and aspects disclosed above are for purposes of illustration and are not intended to be limiting.

What is claimed is:

1. A wearable-item-descriptive content handling method comprising:

invoking transistor-based circuitry configured to obtain numerous normalized wearable item depictions pertaining to a first target language from a machine-learning-based image classification protocol that was trained using very numerous wearable item depictions that each associate one or more graphical images with corresponding textual metadata, wherein each of the normalized wearable item depictions pertaining to the first target language associates one or more wearable-item-depictive visible properties with one or more wearable-item-depictive textual descriptions of the corresponding textual metadata;

invoking transistor-based circuitry configured to compare a target-language-specific list of wearable-item-related terms with the textual metadata in a first depiction of the numerous normalized wearable item depictions as a pre-processing component of extracting a relevant textual snippet in the first target language from the first depiction of the numerous normalized wearable item depictions;

invoking transistor-based circuitry configured to configure a first functional module by indexing the numerous normalized wearable item depictions pertaining to the first target language into the first functional module so that the first functional module applies a wearable item relevance protocol so that first raw content is prioritized over second raw content as an automatic and conditional response partly based on a detection module configured to determine that the first raw content matches an element of the numerous normalized wearable item depictions and that the second raw content does not match any element of the numerous normalized wearable item depictions, wherein the first and second raw content are components of raw data processed by the first functional module; and transmitting at least some of the first raw content as an automatic and conditional response partly based on the first raw content matching any of the numerous normalized wearable item depictions and partly based on the second raw content not matching any of the numerous normalized wearable item depictions.

2. The method of claim 1, wherein the transmitting at least some of the first raw content comprises:

causing an output of a search result to display hardware of a client device as a search result generated by a search engine in response to a search query including one or more search criteria, wherein the output includes a portion of the first raw content but does not include any of the second raw content.

3. The method of claim 1, wherein the detection module prioritizes the first raw content over the second raw content in response to a determination that the first raw content matches an element of the numerous normalized wearable item depictions and that the second raw content does not match any element of the numerous normalized wearable item depictions.

4. A wearable-item-descriptive content handling method comprising:
  invoking transistor-based circuitry configured to obtain numerous normalized wearable item depictions pertaining to a first target language from a machine-learning-based image classification protocol that was trained using very numerous wearable item depictions that each associate one or more graphical images with corresponding textual metadata, wherein each of the normalized wearable item depictions pertaining to the first target language associates one or more wearable-item-depictive visible properties with one or more wearable-item-depictive textual descriptions of the corresponding textual metadata;
  invoking transistor-based circuitry configured to configure a first functional module by indexing the numerous normalized wearable item depictions pertaining to the first target language into the first functional module so that the first functional module applies a wearable item relevance protocol as an automatic and conditional response partly based on the first raw content matching any of the numerous normalized wearable item depictions and partly based on the second raw content not matching any of the numerous normalized wearable item depictions, wherein the first and second raw content are components of raw data processed by the first functional module; and
  transmitting at least some of the first raw content as an automatic and conditional response partly based on the first raw content matching any of the numerous normalized wearable item depictions and partly based on the second raw content not matching any of the numerous normalized wearable item depictions.

5. The method of claim 4, wherein the configuring the first functional module by indexing the numerous normalized wearable item depictions pertaining to the first target language into the first functional module comprises:
  forming a first information vector by quantifying several visual aspects of a first wearable item in a first normalized wearable item depiction of the numerous normalized wearable item depictions, wherein the first raw content includes the several visual aspects of the first wearable item;
  forming a second information vector by quantifying several visual aspects of a second wearable item in a second normalized wearable item depiction of the numerous normalized wearable item depictions, wherein the second raw content includes the several visual aspects of the second wearable item;
  forming a third information vector by quantifying several visual aspects of a third wearable item in a third normalized wearable item depiction of the numerous normalized wearable item depictions, wherein the third raw content includes the several visual aspects of the third wearable item;
  forming an other information vector by quantifying several visual aspects of an other wearable item in an other normalized wearable item depiction of the numerous normalized wearable item depictions, wherein the other raw content includes the several visual aspects of the other wearable item; and
  periodically presenting via a user device to a user as an automatic and conditional response partly based on a determination that an available inventory of the third wearable item has become available and partly based on a determination that a divergence between the third information vector and the other information vector is smaller than a threshold, wherein one or more records indicate that the other wearable item has previously been presented to the user.

6. The method of claim 4, wherein the configuring the first functional module by indexing the numerous normalized wearable item depictions pertaining to the first target language into the first functional module comprises:
  forming a first information vector by quantifying several visual aspects of a first wearable item in a first normalized wearable item depiction of the numerous normalized wearable item depictions, wherein the first raw content includes the several visual aspects of the first wearable item;
  forming a second information vector by quantifying several visual aspects of a second wearable item in a second normalized wearable item depiction of the numerous normalized wearable item depictions, wherein the second raw content includes the several visual aspects of the second wearable item;
  forming an other information vector by quantifying several visual aspects of an other wearable item in an other normalized wearable item depiction of the numerous normalized wearable item depictions, wherein the other raw content includes the several visual aspects of the other wearable item;
  responding to a determination that an available inventory of the first wearable item is presently exhausted by presenting via a mobile device a selective suggestion of the other wearable item partly based on a determination that an available inventory of the other wearable item is not presently exhausted and partly based on a determination that a divergence between the other information vector and the first information vector is smaller than a threshold.

7. The method of claim 4, wherein the configuring the first functional module by indexing the numerous normalized wearable item depictions pertaining to the first target language into the first functional module comprises:
  forming a first information vector by quantifying several visual aspects of a first wearable item in a first normalized wearable item depiction of the numerous normalized wearable item depictions, wherein the first raw content includes the several visual aspects of the first wearable item;
  forming a second information vector by quantifying several visual aspects of a second wearable item in a second normalized wearable item depiction of the numerous normalized wearable item depictions, wherein the second raw content includes the several visual aspects of the second wearable item; and
  automatically determining that the first wearable item is more relevant than the second wearable item by determining that a divergence between the first information vector and an ideal vector is smaller than a divergence between the second information vector and the ideal vector.

8. The method of claim 4, wherein the configuring the first functional module by indexing the numerous normalized wearable item depictions pertaining to the first target language into the first functional module comprises:
grouping first and second products depicted in respective ones of the numerous normalized wearable item depictions; and
presenting predictive content relating to the first product in association with the second product in response to the grouping of the first and second products depicted in the respective ones of the numerous normalized wearable item depictions.

9. The method of claim 4, wherein the configuring the first functional module by indexing the numerous normalized wearable item depictions pertaining to the first target language into the first functional module comprises:
presenting one or more brand-specific depictions of the numerous normalized wearable item depictions pertaining to the first target language combined with corresponding brand information so that a resulting vector thereof can be used to facilitate pricing of new wearable items.

10. The method of claim 4, wherein the configuring the first functional module by indexing the numerous normalized wearable item depictions pertaining to the first target language into the first functional module comprises:
placing keywords pertaining to a wearable item on a detail page so that said keywords are indexed into a general search engine.

11. The method of claim 4, wherein the configuring the first functional module by indexing the numerous normalized wearable item depictions pertaining to the first target language into the first functional module comprises:
automatically evaluating a retail display ad according to how many terms in the retail display ad match keywords in a list of keywords extracted from the numerous normalized wearable item depictions.

12. The method of claim 4, wherein the configuring the first functional module by indexing the numerous normalized wearable item depictions pertaining to the first target language into the first functional module comprises:
automatically translating the numerous normalized wearable item depictions pertaining to the first target language into multiple other target languages, wherein at least some of the first raw content that has been automatically translated is transmitted in the multiple target languages without any post-translation human review.

13. The method of claim 4, comprising:
comparing a target-language-specific list of wearable-item-related terms with the textual metadata in a first depiction of the numerous normalized wearable item depictions as a pre-processing component of extracting a relevant textual snippet in the first target language from the first depiction of the numerous normalized wearable item depictions.

14. A wearable-item-descriptive content handling system comprising:
transistor-based circuitry configured to obtain numerous normalized wearable item depictions pertaining to a first target language from a machine-learning-based image classification protocol that was trained using very numerous wearable item depictions that each associate one or more graphical images with corresponding textual metadata, wherein each of the normalized wearable item depictions pertaining to the first target language associates one or more wearable-item-depictive visible properties with one or more wearable-item-depictive textual descriptions of the corresponding textual metadata;
transistor-based circuitry configured to configure a first functional module by indexing the numerous normalized wearable item depictions pertaining to the first target language into the first functional module so that the first functional module applies a wearable item relevance protocol as an automatic and conditional response partly based on the first raw content matching any of the numerous normalized wearable item depictions and partly based on the second raw content not matching any of the numerous normalized wearable item depictions, wherein the first and second raw content are components of raw data processed by the first functional module; and
transistor-based circuitry configured to transmit at least some of the first raw content as an automatic and conditional response partly based on the first raw content matching any of the numerous normalized wearable item depictions and partly based on the second raw content not matching any of the numerous normalized wearable item depictions.

* * * * *